US006799016B2

(12) United States Patent
Davis et al.

(10) Patent No.: US 6,799,016 B2
(45) Date of Patent: Sep. 28, 2004

(54) METHOD FOR MAPPING POOR COVERAGE AREAS

(75) Inventors: Scott B. Davis, Walworth, WI (US); Michael A. Newell, Williams Bay, WI (US)

(73) Assignee: Motorola, Inc., Schaumburg, IL (US)

( * ) Notice: Subject to any disclaimer, the term of this patent is extended or adjusted under 35 U.S.C. 154(b) by 135 days.

(21) Appl. No.: 09/960,123

(22) Filed: Sep. 21, 2001

(65) Prior Publication Data

US 2003/0061009 A1 Mar. 27, 2003

(51) Int. Cl.[7] .............................................. H04B 17/00
(52) U.S. Cl. ................................. 455/67.13; 455/63.3
(58) Field of Search ............................ 455/456.1, 456.6, 455/63.1, 63.3, 67.13, 432.1, 432.2, 513, 447, 67.11, 436, 425; 370/332

(56) References Cited

U.S. PATENT DOCUMENTS

| | | | |
|---|---|---|---|
| 5,032,835 A | * | 7/1991 | DeLuca ...................... 340/7.38 |
| 5,809,414 A | * | 9/1998 | Coverdale et al. .......... 455/421 |
| 6,055,426 A | | 4/2000 | Beasley |
| 6,072,778 A | | 6/2000 | Labedz et al. |
| 6,088,588 A | * | 7/2000 | Osborne ...................... 455/425 |
| 6,188,894 B1 | | 2/2001 | Clancy |
| 6,442,393 B1 | * | 8/2002 | Hogan ...................... 455/456.5 |
| 6,625,135 B1 | * | 9/2003 | Johnson et al. ............. 370/332 |

* cited by examiner

Primary Examiner—Nguyen T. Vo
Assistant Examiner—Farima Farkhondar
(74) Attorney, Agent, or Firm—Kevin D. Wills

(57) ABSTRACT

A method of creating a database of poor coverage areas (120) in a wireless communication system includes (100) determining if a signal quality metric (204) of a communication link (130) in a poor coverage area (120) is below a signal quality threshold (202) then incrementing a poor coverage area counter (210), if not, incrementing a good coverage area counter (212). Storing one or more previous coverage areas (138–140) traversed by wireless device (102) prior to entering the poor coverage area (120) and calculating a trajectory (136) to the poor coverage area (120) based on one or more previous coverage areas (138–140) and poor coverage area (120). Subsequently, anticipating entry of the wireless device (102) into the poor coverage area (120) utilizing the trajectory (136) to the poor coverage area (120) and alerting a user of wireless device (102).

36 Claims, 5 Drawing Sheets

METHOD FOR MAPPING POOR COVERAGE AREAS

FIELD OF THE INVENTION

This invention relates generally to wireless communication and, more particularly to a method of creating a database of poor coverage areas in wireless communication systems.

BACKGROUND OF THE INVENTION

Many wireless systems, including cellular systems, exist today. Some wireless systems are more mature and provide nearly ubiquitous coverage for a specific region, while other, newer systems are still building out their systems to provide complete coverage in an area. Users often move through poor coverage areas, especially in newer systems, and drop calls. These areas are generally found by trial an error, with few system operators declaring system deficiencies. On occasion, coverage areas can change due to loading on the system or depending if the portable cellular devices is in or out of a vehicle, building, and the like. This has the effect of the system dropping calls and increased user inconvenience, which culminates in a decreased efficiency of the wireless system. Current methods of determining poor coverage areas include driving around with a Global Positioning System unit and a cellular phone or other data gathering device and manually charting the system coverage, with users able to purchase coverage information. These methods have the disadvantage of possibly being out of date, incomplete, inaccurate and inconvenient to use. These prior art methods fail to include a time dimension and do not account for changes in coverage associated with the time of day, week, and the like. In addition, the current methods do not predict poor coverage areas or provide any sort of warnings to a user.

Accordingly, there is a significant need for methods of creating a database of poor coverage areas in a wireless system that overcome the deficiencies of the prior art outlined above.

BRIEF DESCRIPTION OF THE DRAWINGS

Referring to the drawing.

Figure 1:
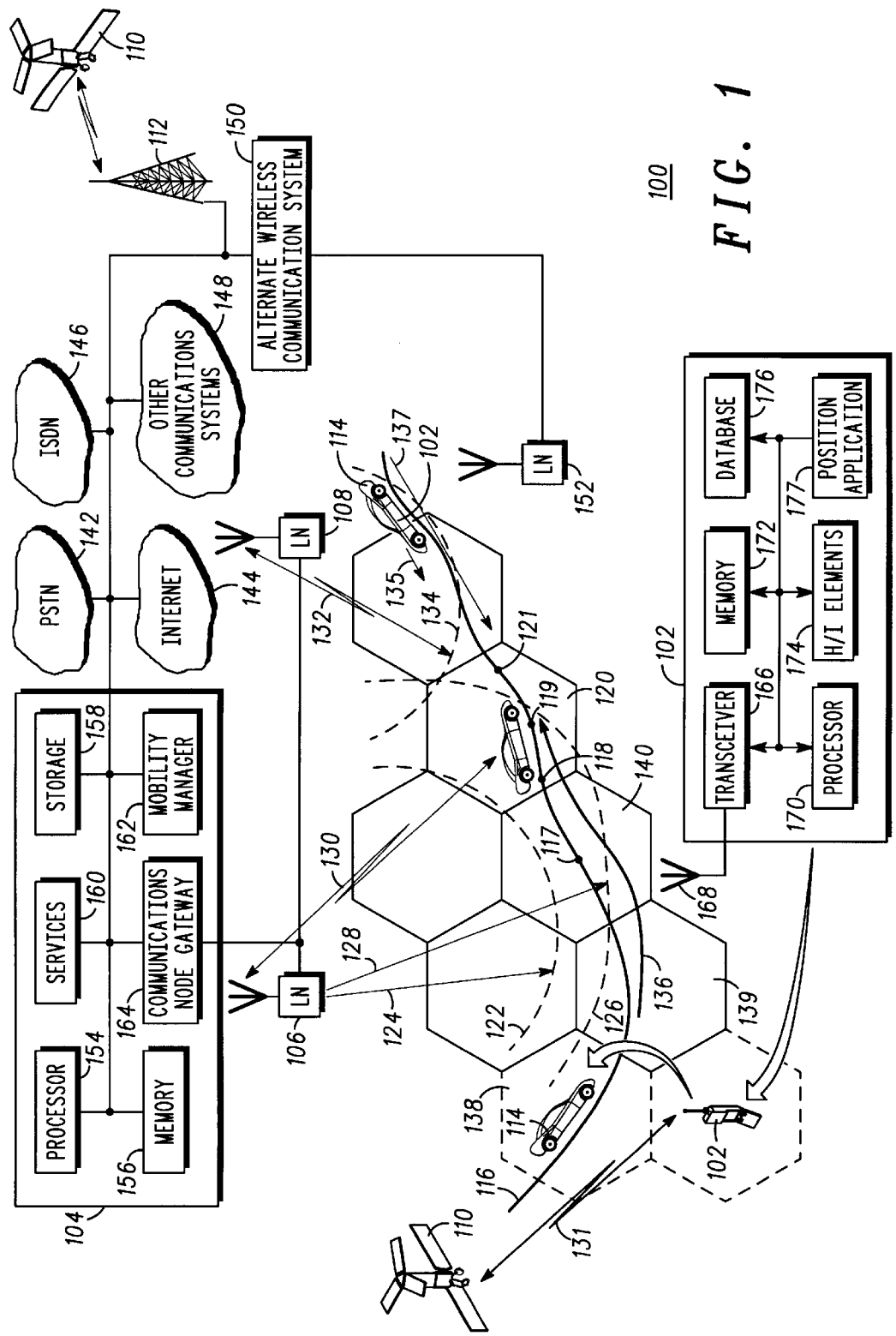
FIG. 1 depicts an exemplary wireless communication system, according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of creating a database of poor coverage areas in a wireless communication system with software components running on wireless devices or on remote server platforms, or a combination of the two. An embodiment of the invention can operate independent of the system operator or service external to the wireless device or in some combination of the system operator, a third party service and the wireless device. To provide an example of one context in which the present invention may be used, an example of a method of creating a database of poor coverage areas in a wireless communication system will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

FIG. 1 depicts an exemplary wireless communication system 100, according to one embodiment of the invention. As shown in FIG. 1, wireless communication system 100 includes a wireless device 102, communications node 104, and one or more local nodes 106, 108. Communications node 104 includes a communications node gateway 164 which comprise one or more network access devices (NAD's) that can utilize narrowband and/or broadband connections with standard cellular network protocols such as Global System for Mobile Communications (GSM), Time Division Multiple Access (TDMA), Code Division Multiple Access (CDMA), and the like. In another embodiment, standard transmission control protocol/internet protocol (TCP/IP) can also be used. Communications node gateway 164 can also send and receive content using standard paging networks, FM sub-carriers, satellite networks, and the like.

Coupled to communications node gateway 164 is a processor 154 for processing algorithms stored in memory 156. Memory 156 comprises control algorithms, and can include, but is not limited to, random access memory (RAM), read only memory (ROM), flash memory, electrically erasable programmable ROM (EEPROM), and the like. Memory 156 can contain stored instructions, tables, data, and the like, to be utilized by processor 154. Storage 158 is also coupled to communications node gateway 164 and can be used to store information pertaining to wireless communication system 100, for example, personal profiles, usage history, preferences, and the like. Services 160 can be offered to users of wireless communication system 100 via wireless device 102.

Services 160 can be located at communications node 104, distributed between communications node 104 and other communications nodes, other communications systems 148, and the like. A service 160 can be an encapsulation of some functionality that is of use to one or more service-using entities (current or anticipated) or that needs to be isolated from the service-using entity for some reason. A service can provide access to information or perform some computation. Services 160 also provide a desired functionality of a human user, such as applications, an on-board global positioning system (GPS) device, games, email, and the like.

Mobility manager 162 is coupled to communications node gateway 164 and provides mobility management to any number of wireless devices 102 utilizing methods known in the art. The elements shown in communications node 104 are exemplary and not limiting of the invention. Other hardware and software blocks can also be included in communications node 104 and are also within the scope of the invention.

Communications node 104 can be coupled to a public switched telecommunication network (PSTN) 142, Internet 144, an integrated services digital network (ISDN) 146, local area network (LAN) wide area network (WAN), satellites 110 via relay station 112, other communications systems 148, and any number of alternate wireless communication systems 150.

Communications node 104 is coupled to any number of local nodes 106, 108, which provides wireless communication to and from wireless device 102 via wireless communication links 130, 132. Wireless device 102 also can communicate with satellite 110 via wireless communication link 131. Wireless device 102 without limitation can include a wireless unit such as a cellular or Personal Communication System (PCS) telephone, a pager, a hand-held computing device such as a personal digital assistant (PDA) or Web appliance, a personal computer, or any other type of wireless communications and/or computing device. Without limitation, one or more wireless devices 102 can be contained within, and optionally form an integral part of a vehicle 114, such as a car, truck, bus, train, aircraft, or boat, and the like. Wireless device 102 can also be implemented in a device that can be carried by a user.

Wireless device 102 includes a transceiver 166 designed to communicate with communications node 104 through antenna 168. Transceiver is coupled to a processor 170 for processing algorithms stored in memory 172. Memory 172 comprises control algorithms, and can include, but is not limited to, random access memory (RAM), read only memory (ROM), flash memory, electrically erasable programmable ROM (EEPROM), and the like. Memory 172 can contain stored instructions, tables, data, and the like, to be utilized by processor 170. Transceiver is also coupled to human interface (H/I) elements 174, position application 177 and database 176.

Human interface (H/I) elements 174 comprise elements such as a display, a multi-position controller, one or more control knobs, one or more indicators such as bulbs or light emitting diodes (LEDs), one or more control buttons, one or more speakers, a microphone, and any other H/I elements required by wireless device. H/I elements 174 can request and display content and data including, application data, position data, personal data, email, audio/video, and the like. The invention is not limited by the (H/I) elements described above. As those skilled in the art will appreciate, the (H/I) elements outlined above are meant to be representative and to not reflect all possible (H/I) elements that may be employed.

Position application 177 can include any number of position sources, devices and software elements designed to determine a location 119 of wireless device 102. Examples of sources and devices, without limitation, include global positioning system (GPS), differential GPS, a kiosk (fixed position source), and enhanced observed time difference (EOTD), which comprise terrestrial cellular triangulation, and the like. Other navigational position sources and software can include, without limitation, an airspeed device, Doppler device, inclinometer, accelerometer, any combination of optical transmitters, receivers, reflectors, optically readable tag, gyro, and the like.

Database 176 can include a hard drive, floppy disk drive, optical drive, CD-ROM, RAM, ROM, EEPROM, or any other means of storing content, which can be utilized by wireless device 102. In the embodiment depicted in FIG. 1, database functions to store wireless device 102 location information, and poor coverage area 120 information. However, database 176 is not limited to these functions, and other database 176 functions are within the scope of the invention.

In the embodiment shown in FIG. 1, wireless device 102 is carried or mounted in a vehicle 114, while the vehicle is driven on a path or roadway 116. The entire coverage area for each of local nodes 106, 108 can be divided into individual coverage areas 138–140. In the embodiment shown in FIG. 1, coverage areas 138–140 are exemplary. The entire coverage area can be divided into any number of coverage areas as part of the invention. Although coverage areas 138–140 are shown as hexagonal in shape, coverage areas 138–140 can be any shape or size depending on the location, density of users, topography, and the like. This allows the memory requirements to be smaller since not every point in a coverage area 138–140 needs to be stored. This also alleviates multiple notifications to users as the coverage area is traversed. As an example of an embodiment, coverage areas 138–140 can be 100 meters on a side.

Local nodes 106, 108 each have a range with an associated radius of coverage, inside of which, communication between communications node 104 and wireless device 102 can take place. As an example of an embodiment of the invention, local node 106 has a first range 122 with an associated first radius of coverage 124, and a second range 126 with an associated second radius of coverage 128. Radius of coverage for local node 106 can fall in between first range 122 and second range 126 as well, and depends conditions, for example, number of wireless devices 102 communicating with local node 106 (loading), topography, weather conditions, obstructions between local node 106 and wireless device 102, and the like. Local node 108 also has an associated range 134 and radius of coverage (not shown for clarity), which can fluctuate for reasons analogous with local node 106 described above.

Although most wireless communication systems 100 provide that radius of coverage for local nodes overlap to ensure proper call handoff between local nodes, when radius of coverage fluctuates due to reasons above, there can exist one or more poor coverage areas 120 in a wireless communication system 100. Poor coverage areas 120 can also exist in wireless communication system 100 due to geography, or intentional omission of coverage in a certain area as well. In a poor coverage area 120, wireless communication link 130, 132 becomes inadequate, generating either poor call quality for a user of wireless device 102 or a disconnection of wireless device 102 from wireless communication system 100, commonly known as a dropped call.

In an embodiment of the invention, a database 176 of poor coverage areas 120 in wireless communication system 100 is created by wireless device 102. As wireless device 102 traverses roadway 116, a location 119 of wireless device 102 is determined at timed intervals, which can be set by a user, a manufacturer of wireless device 102, an operator of wireless communication system 100, and the like. Each location 119 of wireless device 102 is associated with a coverage area 138–140. When a coverage area 138–140 is determined to be a poor coverage area 120, as described more fully below, wireless device 102 stores poor coverage area 120 in database 176. In an embodiment of the invention, a trajectory 136 of wireless device 102 to poor coverage area 120 is also stored in database 176. Trajectory 136 includes previous coverage areas traversed by wireless device prior to entering poor coverage area 120. As an example, in FIG. 1, coverage areas 138, 139 and 140 are previous coverage areas since wireless device 102 traversed these on roadway 116 prior to entering poor coverage area 120. Previous coverage areas 138–140 traversed by wireless device 102 are determined analogously to poor coverage area 120 by utilizing position application 177 to determine prior locations 117, 118 and corresponding previous coverage areas.

Once a poor coverage area 120 and its associated trajectory 136 is calculated and stored in database 176, wireless device 102 can then anticipate entry into poor coverage area 120 and take action to warn the user of wireless device 102 or compensate. In an embodiment of the invention, anticipating entry into poor coverage area 120 can comprise switching wireless device 102 to an alternate wireless communication system 150 prior to entering poor coverage area 120. Alternate communication system 150 can include, without limitation, a system similar to wireless communication system 100, a satellite communication system, a system with a communications protocol different from the one wireless device 102 is presently utilizing, such as CDMA, TDMA, GSM, and the like. As depicted in FIG. 1, alternate communication system 150 can comprise one or more of its own local nodes 152 whose range and radius of coverage overlap with that of local nodes 106, 108 of wireless communication system 100.

In another embodiment, wireless device 102 can anticipate entry into poor coverage area 120 and alert the user of wireless device 102. In yet another embodiment, if a coverage area becomes a poor coverage area 120 while wireless device 102 is being utilized in that area, wireless device 102 can also alert the user, switch to an alternate wireless communication system 150, and the like.

In another embodiment of the invention, wireless device 102 can anticipate entry into poor coverage area 120 utilizing second trajectory 137, which is based on a vector 135 of wireless device 102 and poor coverage area 120. For example, as shown in FIG. 1, wireless device 102 can have a vector 135 toward poor coverage area 120, even if wireless device 102 has not previously been on the particular vehicle roadway 116 to establish a history of passing through previous coverage areas. Utilizing the poor coverage area 120 already stored in database 176 and vector 135, wireless device can predict the possible entry of wireless device 102 into poor coverage area 120. In another embodiment, wireless device 102 can anticipate entry into poor coverage area 120, warn the user, and take corrective action as described above. In still another embodiment, wireless device 102 may anticipate, warn and correct as described above only within a specified range of poor coverage area 120.

Software blocks that perform embodiments of the invention are part of computer program modules comprising computer instructions, such as control algorithms, that are stored in a computer-readable medium such as memory described above. Computer instructions can instruct processors to perform methods of creating a database of poor coverage areas 120 in wireless communication system 100. In other embodiments, additional modules could be provided as needed.

Figure 2:
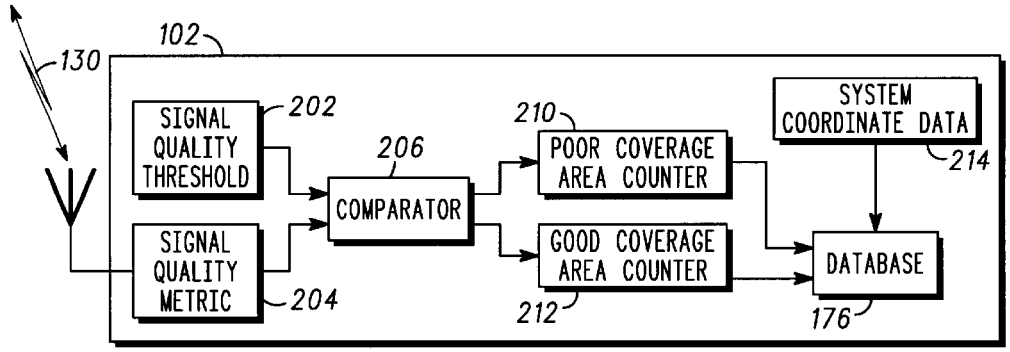
FIG. 2 illustrates a simplified block diagram of a wireless device, according to one embodiment of the invention.

FIG. 2 illustrates a simplified block diagram 200 of a wireless device 102, according to one embodiment of the invention. As depicted in FIG. 2, wireless device 102 can send and receive content via wireless communication link 130. While wireless device 102 is in two-way communication via communication link 130 in a coverage area or in a passive, receiving only mode, one or more signal quality metrics 204 of communication link 130 are compared with a corresponding signal quality threshold 202. Signal quality metric 204 can include, without limitation, the signal strength, signal error rate (which can include frame error rate and bit error rate), relative signal strength indicator (RSSI), whether the call gets dropped and communication link 130 is terminated while in the coverage area, and the like.

Signal quality threshold 202 is a minimum acceptable level of signal quality metric 204 of communication link 130, and can be user-definable and standardized for wireless communication system 100 by a system operator, preprogrammed into wireless device 102, and can be different depending on the particular application or location, and the like. For example, in an analog wireless device, signal strength below −116 decibels relative to one milliwatt (dbm) can be a signal quality threshold. In other words, in an analog wireless device, if the signal strength of communication link 130 falls below a minimum signal strength threshold of −116 dbm, the coverage area associated with the current location of wireless device 102 can be recorded as a poor coverage area 120.

As another example, signal quality metric can include signal error rate, which includes frame error rate and bit error rate for digital systems. If the signal error rate falls below a signal error rate threshold, the coverage area associated with the current location of wireless device 102 can be recorded as a poor coverage area 120. In an embodiment of the invention, a frame error rate greater than 2% can be a signal error rate threshold.

Using one or more signal quality metrics 204 to determine a poor coverage area 120 is within the scope of the invention. In an embodiment of the invention, one signal quality metric 204 falling below a signal quality threshold 202 can indicate a poor coverage area 120. In another embodiment, two or more signal quality metrics 204 falling below their respective signal quality thresholds 202 can be required to indicate a poor coverage area 120. In yet another embodiment, the signal quality metric 202 can vary with the time of day or week. For example, if wireless device 102 regularly enters a coverage area that only has poor coverage during rush hour, the coverage area may be flagged as a poor coverage area 120 only for rush hour. In another embodiment, since a coverage area can be designated a poor coverage area 120 for certain times of the day or week, a user will be warned that they are entering or are in a poor coverage area 120 only during those time of the day or week. These embodiments are not limiting of the invention and one skilled in the art can conceive of other embodiments within the scope of the invention.

As shown in FIG. 2, signal quality metric 204 is compared with signal quality threshold 202 via comparator 206. If signal quality metric 204 in the coverage area drops below signal quality threshold 202, the coverage area is determined to be a poor coverage area 120 and poor coverage area counter 210 that corresponds to that particular poor coverage area 120 is incremented and stored in database 176. In another embodiment, determining that the coverage area is a poor coverage area 120 can be an increment of poor coverage area counter 210. In addition, if poor coverage area 120 has not been previously recorded in database 176, a set of system coordinate data 214 for that poor coverage area 120 is stored in database 176. System coordinate data 214 can include, for example, location coordinates (longitude, latitude, elevation), time of day, time of week, previous coverage areas 138–140, trajectory 136, loading of wireless communication system 100, and the like. These system coordinate data 214 are merely examples, and other system coordinate data 214 will occur to one skilled in the art and are within the scope of the invention. If the coverage area is already tagged as a poor coverage area 120 and stored in database 176, then poor coverage area counter 210 is incremented without storing system coordinate data 214 related to location of wireless device 102. However, system coordinate data 214 related to the time of day, day of the week, and the like, is stored to account for temporal variations in signal quality metric 204 in poor coverage area 120.

If current location 119 of wireless device 102 indicates, via database 176, that wireless device 102 is in a previously recorded poor coverage area 120 and signal quality metric 204 is above signal quality threshold 202, then good coverage area counter 212 that corresponds to that particular poor coverage area 120 is incremented and stored in database 176.

Figure 3:
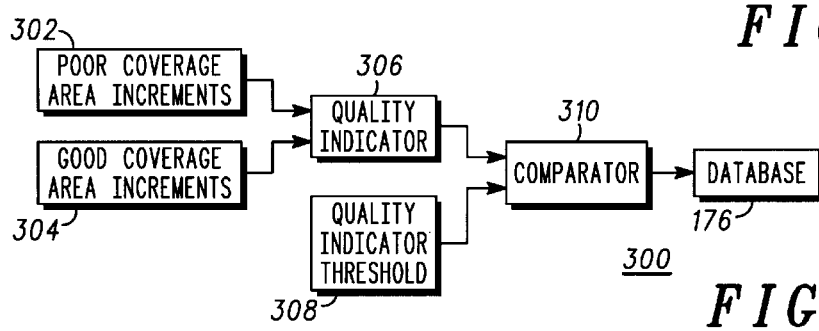
FIG. 3 illustrates a simplified block diagram of elements a wireless device, according to one embodiment of the invention.

FIG. 3 illustrates a simplified block diagram 300 of elements a wireless device 102, according to one embodiment of the invention. As show in FIG. 3, a quality indicator 306 for each poor coverage area 120 is calculated based on the number of poor coverage area increments 302 from poor coverage area counter 210 for that particular poor coverage area 120 and the number of good coverage area increments 304 from good coverage area counter 212 for that particular poor coverage area 120. As an example of an embodiment of the invention, quality indicator 306 can be defined as the ratio of good coverage area increments 304 to poor coverage area increments 302 for a given poor coverage area 120. Other quality indicators 306 can be formulated using good coverage area increments 304 and poor coverage area increments 302 and are within the scope of the invention. For example, quality indicator 306 can be the difference between the number of poor coverage area increments 302 and the number of good coverage area increments 304.

Quality indicator 306 is then compared with quality indicator threshold 308 utilizing comparator 310. Quality indicator threshold 308 can be set by a user of wireless device 102, a system operator of wireless communication system 100, pre-programmed into wireless device 102, and the like. For example, if quality indicator 306 is the ratio of good coverage area increments 304 to poor coverage area increments 302, quality indicator threshold 308 can be set at 1, greater than 1, and the like. When quality indicator 306 meets quality indicator threshold 308, poor coverage area 120 is removed from database 176. Other quality indicators 306 and quality indicator thresholds 308 will occur to one skilled in the art and are encompassed in the scope of the invention. Reasons for no longer being classified as a poor coverage area 120 include, but are not limited to, new local nodes 106, modified antenna patterns, change in system structure, change in system loading, changes in traffic patterns, and the like.

As an example of an embodiment of the invention, when good coverage area increments 304 exceed poor coverage area increments 302, as measured by quality indicator 306 meeting the quality indicator threshold 308 above, poor coverage area 120 can no longer be considered a poor coverage area 120 and removed from database 176 in order to conserve memory and storage space in database 176. Using the ratio embodiment above, quality indicator threshold 308 can be greater than 1, indicating that good coverage area increments 304 must be greater than poor coverage area increments 302 by a certain factor or multiplier, for example 1.5 or 2.0, before poor coverage area 120 is removed from database 176. If in FIG. 3 it is determined that quality indicator 306 fails to meet quality indicator threshold 308, poor coverage area 120 remains in database. The above embodiment is exemplary and not meant to be limiting of the invention and other quality indicator 306 and quality indicator thresholds 308 are within the scope of the invention.

Figure 4:
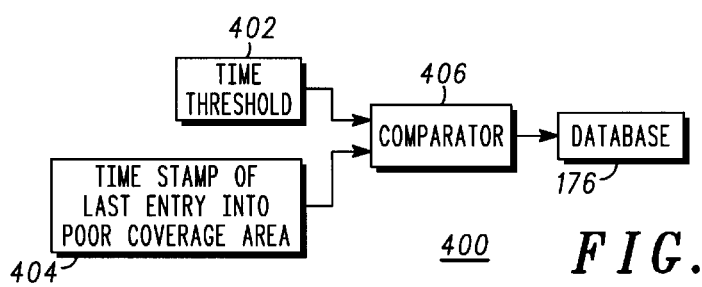
FIG. 4 illustrates a simplified block diagram of elements of a wireless device, according to an embodiment of the invention

FIG. 4 illustrates a simplified block diagram 400 of elements of a wireless device 102, according to an embodiment of the invention. The purpose of the block diagram 400 in FIG. 4 is to remove poor coverage area 120 from database 176 if poor coverage area 120 is not entered by wireless device 102 in a given amount of time. As shown in FIG. 4, a time stamp of the last entry 404 into poor coverage area 120 of wireless device 102 is stored in memory 172 or database 176. If the difference between the current time, as indicated by a clock (not shown for clarity) and the time of last entry 404 is greater than time threshold 402 as determined via comparator 406, poor coverage area 120 is removed from database 176. This has the effect of removing poor coverage area 120 from database 176 when wireless device 102 does not enter it for a time threshold 402, and thereby conserves database 176 memory resources and storage capacity.

Figure 5:
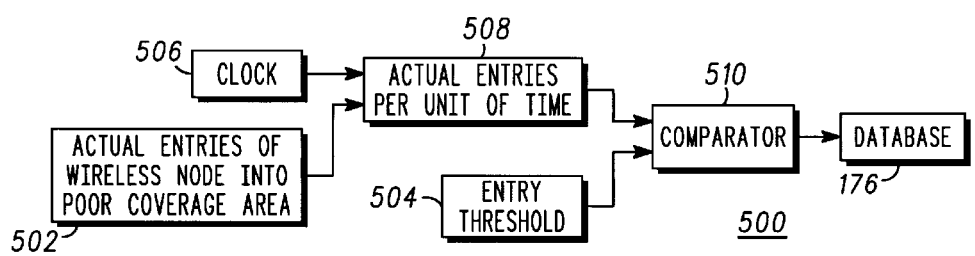
FIG. 5 illustrates a simplified block diagram of elements of a wireless device, according to an embodiment of the invention

FIG. 5 illustrates a simplified block diagram 500 of elements of a wireless device 102, according to an embodiment of the invention. The purpose of the block diagram 500 in FIG. 5 is to remove poor coverage area 120 from database 176 if wireless device 102 does not enter poor coverage area 120 a certain number of times in a given time period. As depicted in FIG. 5, actual number of entries 502 of wireless device 102 into poor coverage area 120 are recorded and along with a unit of time, from clock 506, to yield actual number of entries per unit time 508 of wireless device 102 into poor coverage area. Actual number of entries 502 into poor coverage area 120 can be based on location 119 of wireless device 102 as measured by position application 177 and the determination of coverage area as described above. Actual number of entries per unit time 508 are compared with an entry threshold 504 via comparator 510. Entry threshold 504 is the number of entries of wireless device 102 into poor coverage area 120 that justifies maintaining poor coverage area 120 in database 176. Entry threshold 504 can be user-defined, set of a system administrator of wireless communication system 100, pre-programmed into wireless device 102, and the like. If actual number of entries per unit time 508 are less than entry threshold 504, poor coverage area 120 is removed from database 176. This has the effect of removing poor coverage area 120 from database 176 when wireless device 102 does not enter poor coverage area 120 often enough, thereby conserving database 176 memory resources and storage capacity. An example of an embodiment, entry threshold can be 1 entry per month. In other words, if the actual number of entries 502 of wireless device 102 into poor coverage area 120 does not exceed 1 per month, then poor coverage area 120 is removed from database 176. The above embodiment is exemplary and not meant to be limiting of the invention and other entry thresholds 504 are within the scope of the invention.

Figure 6:
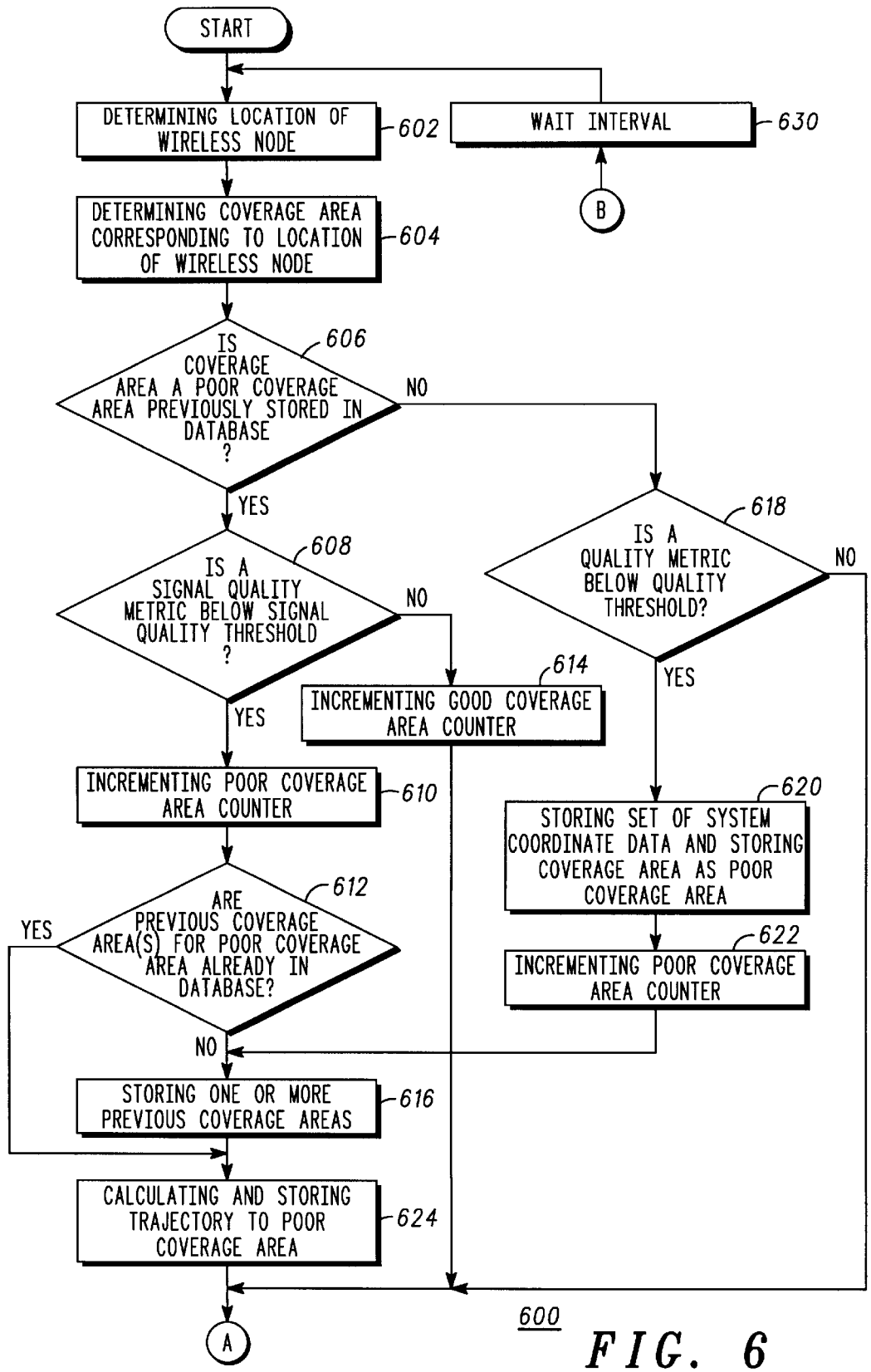
FIGS. 6 and 7 illustrate a flow diagram of a method of creating a database of poor coverage areas, according to one embodiment of the invention.
Figure 7:
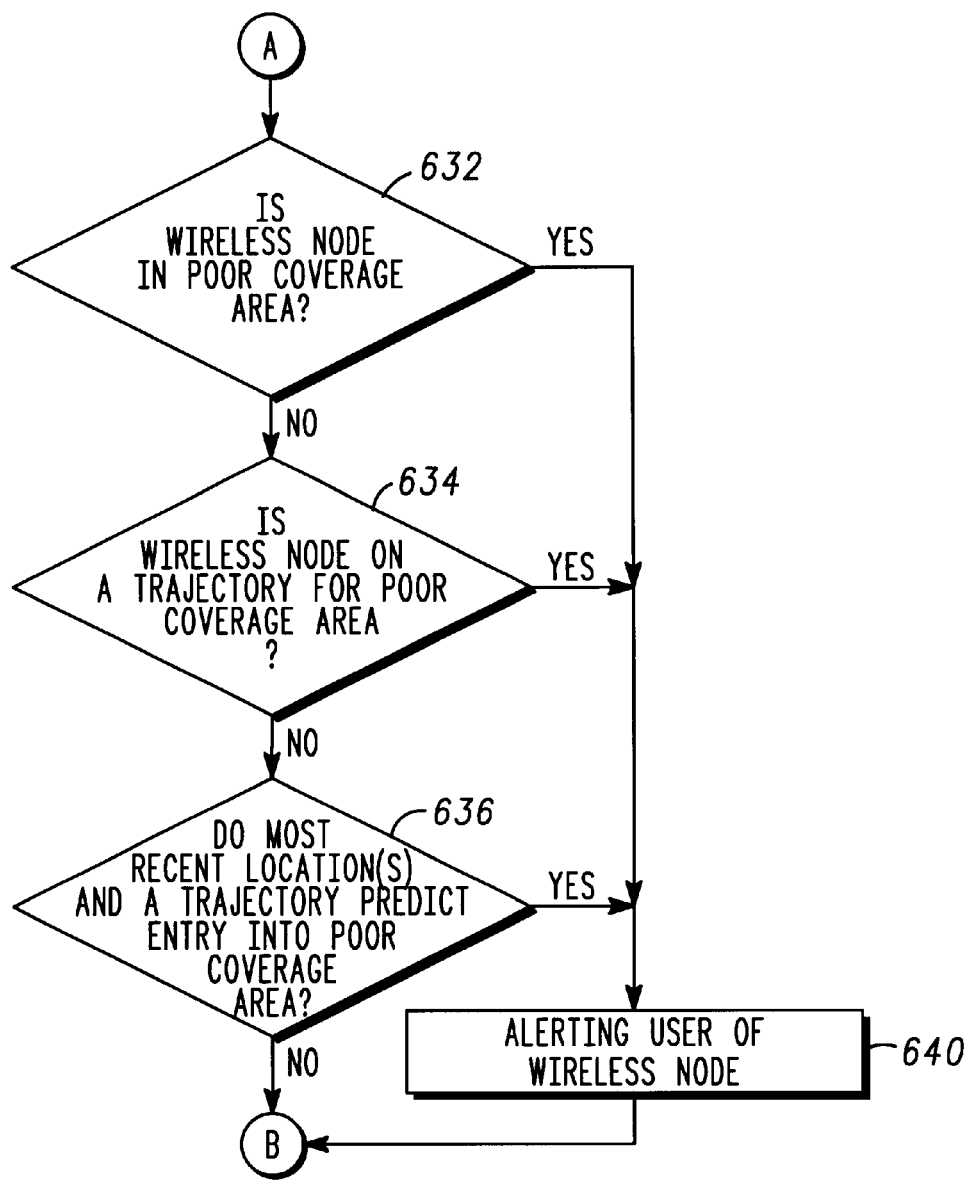

FIGS. 6 and 7 illustrate a flow diagram 600 of a method of creating a database of poor coverage areas, according to one embodiment of the invention. In step 602, location 119 of wireless device 102 is determined using position application 177 as described above. In step 604, coverage area 138–140 corresponding to location 119 of wireless device 102 is determined by correlating a location of wireless device 102 with coverage areas 138–140 as defined in a predetermined grid or database.

In step 606 it is determined if coverage area where wireless device 102 is located is a poor coverage area 120 previously stored in database 176. If so, it is determined if one or more signal quality metrics 204 are below their corresponding signal quality threshold 202 per step 608. Examples of signal quality metric 204 and signal quality threshold 202 are given above. If signal quality metric 204 is below signal quality threshold 202, poor coverage area counter 210 is incremented per step 610. If signal quality metric 204 is above signal quality threshold 202 good coverage area counter 212 is incremented per step 614.

In step 612, it is determined if one or more previous coverage areas 138–140 for poor coverage area 120 are already in database 176. If not, previous coverage areas 138–140 traversed by wireless device 102 prior to entering poor coverage area 120 are stored in database per step 616. This allows for the proper action and/or notification of the user to occur even if trajectory 136 calculated in a previous entry into poor coverage area 120 would not indicate that the user and the wireless device 102 are going to enter poor coverage area 120, but historical usage indicates that if a certain path is followed, poor coverage area 120 will be entered. An example of an embodiment would be a user entering a tunnel or parking structure.

If in step 606, it is determined that poor coverage area 120 where wireless device 102 is currently located is not previously stored in database 176, it is then determined if one or more signal quality metrics 204 are below their corresponding signal quality threshold 202 per step 618. If so, coverage area is stored as a poor coverage area along with set of system coordinate data 214 for poor coverage area per step 620. Also, poor coverage area counter 210 corresponding to poor coverage area 120 is incremented per step 622.

Once a poor coverage area 120 is established as described above, trajectory 136 is calculated and stored based on one or more previous coverage areas 138–140 and poor coverage area 120 per step 624.

Steps 632 through 636 include anticipating entry of wireless device 102 into poor coverage area 120 utilizing trajectory 136. In step 632 it is determined if wireless device 102 is in a poor coverage area 120. If so, user of wireless device 102 is alerted per step 640. If not, it is determined if wireless device 102 is on a trajectory 136 for poor coverage area 120 per step 634. If so, user of wireless device is alerted per step 640. If not, it is determined if most recent locations of wireless device 102 and a trajectory predict entry into poor coverage area per step 636. If so, user of wireless device is alerted per step 640. If not, then a wait interval passes per step 630 before determining a new location 121 of wireless device 102 and returning to the beginning of flow diagram 600. Wait interval can be any amount of time desired between determining a new position of wireless device 102.

Figure 8:
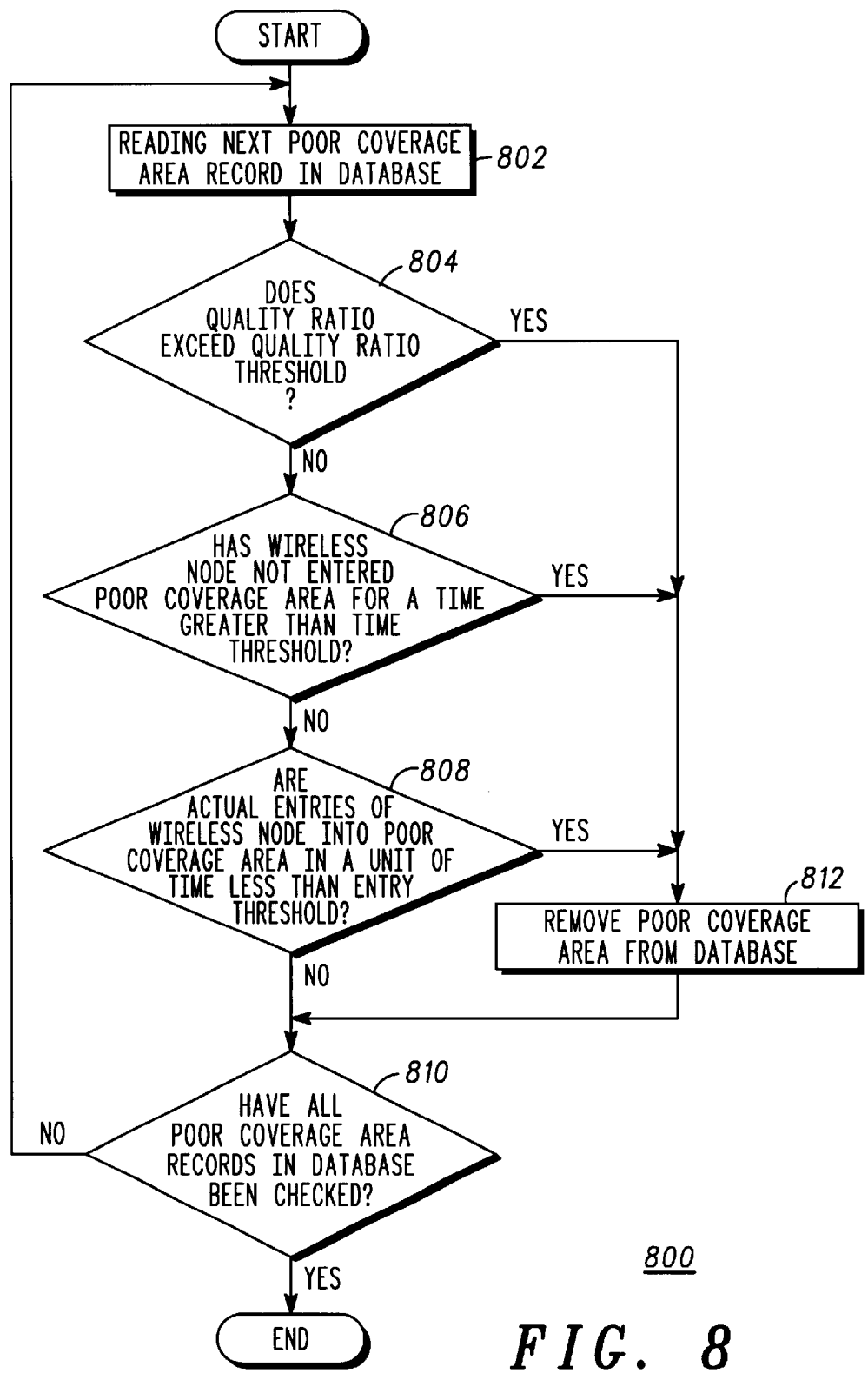
FIG. 8 illustrates a flow diagram of a method of managing a database for poor coverage areas, according to one embodiment of the invention.

FIG. 8 illustrates a flow diagram 800 of a method of managing a database for poor coverage areas 120, according to one embodiment of the invention. The embodiment of the invention depicted in flow diagram 800 in FIG. 8 can operate integrally or separate from the embodiment depicted in flow diagram 600 in FIGS. 6 and 7. In step 802, the next record of poor coverage areas in database 176 is read. In step 804 it is determined if the quality indicator 306 exceeds the quality indicator threshold 308 for a given poor coverage area 120. If so, poor coverage area 120 is removed from database 176 per step 812. If not, it is determined if wireless device 102 has not entered poor coverage area 120 for a time greater than time threshold 402 per step 806. If so, poor coverage area 120 is removed from database 176 per step 812. If not, it is determined if the actual number of entries of wireless device 102 into poor coverage area in a unit of time are less than entry threshold 504 per step 808. If so, poor coverage area 120 is removed from database 176 per step 812. If not, it is determined if all poor coverage area records in database 176 have been checked per step 810. If not, the next poor coverage area record in database 176 is read per step 802.

In an embodiment of the invention, some functions of the invention may be disabled (by the user, system operator, etc.), or the order in which quality metrics are tested, database management performed, and the like, can be varied. Data on poor coverage areas 120 collected by a wireless device 102 can be shared with other wireless devices, uploaded to a common server for use by any number of users and wireless devices, and the like.

The particular elements of the distributed communications system 100 are not limited to those shown and described, and they can take any form that will implement the functions of the invention herein described.

What is claimed is:

1. In a wireless device, a method of creating a database of poor coverage areas in a wireless communication system, comprising:

determining a coverage area corresponding to a location of the wireless device;

determining if a signal quality metric of a communication link in the coverage area drops below a signal quality threshold; wherein if the signal quality metric is below the signal quality threshold designating the coverage area a poor coverage area and incrementing a poor coverage area counter corresponding to the poor coverage area and storing the coverage area as the poor coverage area in the database if the coverage area has not already been stored as the poor coverage area;

determining if the poor coverage area is previously stored in the database, wherein if the poor coverage area is previously stored and the signal quality metric is below the signal quality threshold incrementing the poor coverage area counter corresponding to the poor coverage area, and wherein if the poor coverage area is previously stored and the signal quality metric is above the signal quality threshold incrementing a good coverage area counter corresponding to the poor coverage area;

storing one or more previous coverage areas traversed by the wireless device prior to entering the poor coverage area;

calculating and storing a trajectory to the poor coverage area based on the one or more previous coverage areas and the poor coverage area; and anticipating entry of the wireless device into the poor coverage area utilizing the trajectory to the poor coverage area.

2. The method of claim 1, farther comprising anticipating entry of the wireless device into the poor coverage area utilizing a second trajectory, wherein the second trajectory is based on a vector of the wireless device and the poor coverage area.

3. The method of claim 1, further comprising alerting a user of the wireless device prior to entering the poor coverage area.

4. The method of claim 1, wherein anticipating comprises switching the wireless device to an alternate wireless communication system.

5. The method of claim 1, further comprising calculating a quality indicator for the poor coverage area, wherein the quality indicator is based on a number of good coverage area counter increments and a number of poor coverage area counter increments for the poor coverage area.

6. The method of claim 5, further comprising determining if the quality indicator meets a quality indicator threshold, wherein if the quality indicator meets the quality indicator threshold the poor coverage area is removed from the database.

7. The method of claim 1, further comprising removing the poor coverage area from the database if the wireless device does not enter the poor coverage area for a time greater than a time threshold.

8. The method of claim 1, further comprising defining an entry threshold, wherein the entry threshold is based on a number of entries of the wireless device into the poor coverage area in a unit of time, wherein if an actual number of entries of the wireless device into the poor coverage area in the unit of time is less than the entry threshold the poor coverage area is removed from the database.

9. The method of claim 1, wherein determining if the signal quality metric drops below the signal quality threshold comprises determining if a communication link between the wireless device and the wireless communication system has terminated.

10. The method of claim 1, wherein determining if the signal quality metric drops below the signal quality threshold comprises determining if a signal strength in the poor coverage area drops below a signal strength threshold.

11. The method of claim 1, wherein determining if the signal quality metric drops below the signal quality threshold comprises determining if a signal error rate in the poor coverage area drops below a signal error rate threshold.

12. The method of claim 1, wherein determining if the signal quality metric drops below the signal quality threshold comprises storing a set of system coordinate data based on the location of the wireless device if the bad coverage area counter is incremented, wherein the coverage area is then stored as the poor coverage area if the coverage area is not already in the database as the poor coverage area.

13. A method of creating a database of poor coverage areas in a wireless communication system, comprising:

determining a coverage area corresponding to a location of a wireless device;

determining if a signal quality metric of a communication link in the coverage area drops below a signal quality threshold; wherein if the signal quality metric is below the signal quality threshold designating the coverage area a poor coverage area and incrementing a poor coverage area counter corresponding to the poor coverage area and storing the coverage area as the poor coverage area in the database if the coverage area has not already been stored as the poor coverage area;

determining if the poor coverage area is previously stored in the database, wherein if the poor coverage area is previously stored and the signal quality metric is below the signal quality threshold incrementing the poor coverage area counter corresponding to the poor coverage area, and wherein if the poor coverage area is previously stored and the signal quality metric is above the signal quality threshold incrementing a good coverage area counter corresponding to the poor coverage area;

storing one or more previous coverage areas traversed by the wireless device prior to entering the poor coverage area;

calculating and storing a trajectory to the poor coverage area based on the one or more previous coverage areas and the poor coverage area; and anticipating entry of the wireless device into the poor coverage area utilizing the trajectory to the poor coverage area.

14. The method of claim 13, further comprising anticipating entry of the wireless device into the poor coverage area utilizing a second trajectory, wherein the second trajectory is based on a vector of the wireless device and the poor coverage area.

15. The method of claim 13, further comprising alerting a user of the wireless device prior to entering the poor coverage area.

16. The method of claim 13, wherein anticipating comprises switching the wireless device to an alternate wireless communication system.

17. The method of claim 13, further comprising calculating a quality indicator for the poor coverage area, wherein the quality indicator is based on a number of good coverage area counter increments and a number of poor coverage area counter increments for the poor coverage area.

18. The method of claim 17, further comprising determining if the quality indicator meets a quality indicator threshold, wherein if the quality indicator meets the quality indicator threshold the poor coverage area is removed from the database.

19. The method of claim 13, further comprising removing the poor coverage area from the database if the wireless device does not enter the poor coverage area for a time greater than a time threshold.

20. The method of claim 13, further comprising defining an entry threshold, wherein the entry threshold is based on a number of entries of the wireless device into the poor coverage area in a unit of time, wherein if an actual number of entries of the wireless device into the poor coverage urea in the unit of time is less than the entry threshold the poor coverage area is removed from the database.

21. The method of claim 13, wherein determining if the signal quality metric drops below the signal quality threshold comprises determining if a communication link between the wireless device and the wireless communication system has terminated.

22. The method of claim 13, wherein determining if the signal quality metric drops below the signal quality threshold comprises determining if a signal strength in the poor coverage area drops below a signal strength threshold.

23. The method of claim 13, wherein determining if the signal quality metric drops below the signal quality threshold comprises determining if a signal error rate in the poor coverage area drops below a signal error rate threshold.

24. The method of claim 13, wherein determining if the signal quality metric drops below the signal quality threshold comprises storing a set of system coordinate data based on the location of the wireless device if the bad coverage area counter is incremented, wherein the coverage area is then stored as the poor coverage area if the coverage area is not already in the database as the poor coverage area.

25. In a wireless device, a computer-readable medium containing computer instructions for instructing a processor to perform a method of creating a database of poor coverage areas in a wireless communication system, comprising:

determining a coverage area corresponding to a location of the wireless device;

determining if a signal quality metric of a communication link in the coverage area drops below a signal quality threshold; wherein if the signal quality metric is below the signal quality threshold designating the coverage area a poor coverage area and incrementing a poor coverage area counter corresponding to the poor coverage area and storing the coverage area as the poor coverage area in the database if the coverage area has not already been stored as the poor coverage area;

determining if the poor coverage area is previously stored in the database, wherein if the poor coverage area is previously stored and the signal quality metric is below the signal quality threshold incrementing the poor coverage area counter corresponding to the poor coverage area, and wherein if the poor coverage area is previously stored and the signal quality metric is above the signal quality threshold incrementing a good coverage area counter corresponding to the poor coverage area;

storing one or more previous coverage areas traversed by the wireless device prior to entering the poor coverage area;

calculating and storing a trajectory to the poor coverage area based on the one or more previous coverage areas and the poor coverage area; and anticipating entry of the wireless device into the poor coverage area utilizing the trajectory to the poor coverage area.

26. The method of claim 25, further comprising anticipating entry of the wireless device into the poor coverage area utilizing a second trajectory, wherein the second trajectory is based on a vector of the wireless device and the poor coverage area.

27. The computer-readable medium in claim 25, further comprising alerting a user of the wireless device prior to entering the poor coverage area.

28. The computer-readable medium in claim 25, wherein anticipating comprises switching the wireless device to an alternate wireless communication system.

29. The computer-readable medium in claim 25, further comprising calculating a quality indicator for the poor coverage area, wherein the quality indicator is based on a number of good coverage area counter increments and a number of poor coverage area counter increments for the poor coverage area.

30. The computer-readable medium in claim 29, further comprising determining if the quality indicator meets a quality indicator threshold, wherein if the quality indicator meets the quality indicator threshold the poor coverage area is removed from the database.

31. The computer-readable medium in claim 25, further comprising removing the poor coverage area from the database if the wireless device does not enter the poor coverage area for a time greater than a time threshold.

32. The computer-readable medium in claim 25, further comprising defining an entry threshold, wherein the entry threshold is based on a number of entries of the wireless device into the poor coverage area in a unit of time, wherein if an actual number of entries of the wireless device into the poor coverage area in the unit of time is less than the entry threshold the poor coverage area is removed from the database.

33. The computer-readable medium in claim 25, wherein determining if the signal quality metric drops below the signal quality threshold comprises determining if a communication link between the wireless device and the wireless communication system has terminated.

34. The computer-readable medium in claim 25, wherein determining if the signal quality metric drops below the signal quality threshold comprises determining if a signal strength in the poor coverage area drops below a signal strength threshold.

35. The computer-readable medium in claim 25, wherein determining if the signal quality metric drops below the signal quality threshold comprises determining if a signal error rate in the poor coverage area drops below a signal error rate threshold.

36. The computer-readable medium in claim 25, wherein determining if the signal quality metric drops below the signal quality threshold comprises storing a set of system coordinate data based on the location of the wireless device if the bad coverage area counter is incremented, wherein the coverage area is then stored as the poor coverage area if the coverage area is not already in the database as the poor coverage area.

* * * * *